Patented Mar. 9, 1943

2,313,144

UNITED STATES PATENT OFFICE 2,313,144

PRODUCTION OF AQUEOUS DISPERSIONS OF ETHYLENE POLYMER

Albert Stanley Gomm, Blackley, Manchester, England, assignor to Imperial Chemical Industries Limited, a corporation of Great Britain No Drawing. Application June 5, 1939, Serial No. 277,567. In Great Britain June 7, 1938

1 Claim. (Cl. 260—32)

This invention relates to dispersions and more particularly to the production of dispersons of ethylene polymers in aqueous media.

The ethylene polymers to be used for the purposes of this invention are obtained by subjecting ethylene, with or without a small content of oxygen, to a very high pressure and a moderately elevated temperature as described in United States Patent No. 2,153,553. The mention of ethylene polymers herein is intended to include in addition to the simple polymers the ethylene interpolymers and derivatives of the simple polymers, for example, such as described in British specification No. 497,643 and in British specification No. 481,515. The solid simple ethylene polymers obtained as outlined above melt or soften above about 100° C., usually between 110° C. and 200° C. depending upon the molecular weight of the particular polymer, have high molecular weights ranging from 2000 upwards to 24,000 or even higher e. g. 30,000 or 40,000, and are essentially saturated products corresponding in composition substantially to $(CH_2)_x$. They are soluble in xylene at its boiling point and are unaffected by prolonged contact with air at ordinary temperature. These solid simple polymers as ordinarily prepared show a crystalline structure when subjected to X-ray diffraction analysis. The molecular weights mentioned are the approximate values determined by the method devised by H. Staudinger (see Berichte der deutschen Chemischen Ges., 1934, 67B, 1247 et seq.). The melting or softening points are the values obtained by the "ball and ring" method.

This invention has as an object a method for obtaining valuable aqueous dispersions comprising the above described ethylene polymers. Other objects will appear hereinafter.

According to the invention I dissolve the ethylene polymer in a volatile organic solvent not miscible or only sparingly miscible with water, emulsify the solution in an aqueous medium in the presence of a dispersing or emulsifying agent or agents and/or in the presence of the components of dispersing or emulsifying agents, if desired, in the presence of a protective colloid, and subsequently subject the mixture to conditions whereby the volatile organic solvent is removed by volatilization.

In carrying the invention into effect, the ethylene polymer is dissolved in a volatile organic solvent, if desired, in a hot or boiling volatile solvent, the dispersing agent or agents and/or component or components thereof added to the solution and during continuous agitation at an elevated temperature there is slowly added hot water or a heated aqueous solution in which is dissolved an amount of the dispersing agent or agents and/or component or components thereof. If desired, the volatile organic solvent solution is added to the hot water or aqueous solution under like conditions. The so obtained emulsion is maintained at an elevated temperature, agitated and a current of gas, such as nitrogen, or a mixture of gases such as air is passed through and/or over the agitated liquid, whereby the volatile organic solvent is substantially removed. There is thus obtained a stable dispersion of the polymer in an aqueous medium.

If desired, the emulsion or dispersion is subjected, at any convenient stage in the operation, to a further mechanical treatment process, such as, for example, a homogenizing process or a treatment in a colloid mill.

It is desirable to avoid violent agitation of the emulsion or dispersion as too violent agitation may cause coagulation of the particles of the polymer. To remove the volatile organic solvent from the emulsion it is preferred to pass a current of gas or a mixture of gases over the hot agitated liquid, and it is preferred to use a moist gas or mixture of moist gases, so that evaporation of the aqueous medium is minimized and deposition of solid, which may not be readily redispersed, is to a very large extent prevented. The agitated liquid is maintained at a sufficiently high temperature so that the organic solvent is readily volatilized, but excessively high temperatures should not be used, because such high temperatures may cause volatilization of an unduly large proportion of the aqueous phase. Temperatures of 60°–80° C. are particularly suitable.

If desired, the volatile organic solvent or a proportion of the volatile organic solvent may be recovered by passing the stream of gases and vapors over a condensing surface and subsequently separating the condensed organic liquid from the aqeous liquid.

As volatile organic solvents not miscible or only sparingly miscible with water, there may be used hydrocarbons or halogenated derivatives thereof, for example, aromatic hydrocarbons such as benzene, toluene or xylene, aliphatic hydrocarbons such as petroleum ether, or highly halogenated hydrocarbons such as trichloroethylene. Benzene, toluene and trichloroethylene are particularly suitable solvents and are easily removed from the emulsion. The use of highly halogenated hydrocarbons is convenient, as it avoids the risk of fire.

As dispersing or emulsifying agents it is preferred to use alkali-metal, ammonium or organic amine, for example, triethanolamine or cyclohexylamine, salts of aliphatic carboxylic acids (containing more than 6 carbon atoms) or such salts of mixtures of aliphatic carboxylic acids such as are to be obtained from animal fats or oils, or from vegetable fats or oils such as, for example, China-wood oil, castor oil, linseed oil or soya bean oil. As particularly suitable salts there may be used the triethanolamine salts of stearic acid, oleic acid, alpha-hydroxystearic acid or linseed oil fatty acids; there may also be used the potassium salts or mixtures of the potassium and triethanolamine salts of these acids. There may also be used alkali-metal, ammonium or organic amine salts of the sulfuric esters of aliphatic alcohols (containing more than 6 carbon atoms) or of technical mixtures of such alcohols, for example, the sodium salt of the sulfuric ester of sperm oil alcohols or the sodium salt of the sulfuric ester of technical dodecyl alcohol. There may also be used sulfonated derivatives of aliphatic compounds (containing more than 6 carbon atoms), for example, the sodium salt of oleyl-p-anisidine sulfonic acid or the sodium salt of the sulfonated condensation product prepared according to Example 1 of British specification No. 274,611. These dispersing or emulsifying agents are used as such, or they are added at any stage in the preparation of the dispersion in the form of their basic and/or acidic components, together or separately.

As has been already indicated above it is preferred to use, as dispersing or emulsifying agents, salts of aliphatic carboxylic acids; the use of these compounds enables the production of stable dispersions which do not coagulate on long standing. When using other types of dispersing or emulsifying agent it is frequently desirable to add also a proportion of a protective colloid and thereby very much reduce any tendency for the dispersion to coagulate.

As protective colloids there may be used organic substances known to possess this property, such as, for example, casein, glue, gelatine, gum arabic, alkylated celluloses. The addition of a protective colloid is made at any convenient stage of the process.

The following examples, in which the parts are by weight, illustrate but do not limit the invention.

*Example I*

30 parts of ethylene polymer (molecular weight above 20,000), 3.75 parts of triethanolamine and 7.5 parts of stearic acid are mixed with 325 parts of benzene and the mixture is heated at a temperature of 80–90° C. under a reflux condenser until all the polymer is dissolved. 1 part of potassium hydroxide is dissolved in 200 parts of water, the solution is heated to a temperature of 60–70° C. and added, with stirring, to the hot solution of the polymer. The coarse emulsion so obtained is passed through a "Hurcol" homogeniser (the word "Hurcol" is a registered trade-mark), removed therefrom, stirred, maintained at a temperature of 60–80° C. and a stream of wet air passed over the stirred liquid until the benzene is substantially removed. A fine, white dispersion of the ethylene polymer is obtained.

*Example II*

30 parts of ethylene polymer (molecular weight less than 20,000), 5 parts of oleic acid and 2.5 parts of triethanolamine are mixed with 225 parts of benzene and the mixture is heated at a temperature of 80–90° C. under a reflux condenser until the polymer is dissolved. To this hot solution is added with stirring 170 parts of water, previously heated to a temperature of 60–70° C. The further procedure is as described in Example I, except that a stream of nitrogen is passed over the stirred liquid to remove the volatile solvent, and there is thus obtained a fine, white dispersion of the polymer.

*Example III*

100 parts of ethylene polymer (molecular weight less than 20,000), 25 parts of stearic acid and 12.5 parts of triethanolamine are mixed with 1000 parts of trichloroethylene and the mixture is heated at a temperature of 70–90° C. under a reflux condenser until the ethylene polymer is dissolved. To this hot solution is added, with stirring, 570 parts of water containing 3.3 parts of potassium hydroxide, previously heated to a temperature of 60–70° C. The further procedure is as described in Example I. A white dispersion of the polymer is obtained.

*Example IV*

20 parts of an interpolymer of ethylene (60%) and methyl methacrylate (40%) prepared according to the method described in Example 10 of British specification No. 497,643, 5 parts of stearic acid and 2.5 parts of triethanolamine are mixed with 216 parts of benzene and the mixture is heated at a temperature of 80–90° C. under a reflux condenser until the interpolymer is dissolved. 0.66 part of potassium hydroxide is dissolved in 114 parts of water, the solution is heated to a temperature of 60–70° C. and added, with stirring, to the hot solution of the interpolymer. The further treatment is as described in Example I. A finely divided, white dispersion of the interpolymer is obtained.

*Example V*

20 parts of an interpolymer of ethylene (84%) and the diethyl ester of itaconic acid (16%) prepared according to the method described in Example 8 of British specification No. 497,643, 5 parts of stearic acid and 2.5 parts of triethanolamine are mixed with 200 parts of trichloroethylene and the mixture is heated under a reflux condenser at a temperature of 70–90° C. until the interpolymer is dissolved, 0.66 part of potassium hydroxide is dissolved in 114 parts of water, the solution heated to a temperature of 65–75° C. and added, with stirring, to the hot solution of the interpolymer. The further procedure is as described in Example I. A fine, white dispersion of the interpolymer is thus obtained.

*Example VI*

20 parts of a chlorinated ethylene polymer (containing 8.7% of chlorine) prepared according to the method described in Example 4 of British specification No. 481,515, 5 parts of stearic acid and 2.5 parts of triethanolamine are mixed with 216 parts of benzene and the mixture is heated under a reflux condenser at a temperature of 80–90° C. until the polymer is dissolved. The further procedure is as described in Example I. A finely divided dispersion of the chlorinated polymer is obtained.

The dispersions of ethylene polymer described herein find a wide use in the coating and impregnating field, particularly in connection with fabrics, paper, wood, glass, metals and like-materials. The present invention makes possible the production of these valuable compositions by simple and economical procedure.

As many apparently widely different embodiments of this invention may be made without departing from the spirit and scope thereof, it is to be understood that I do not limit myself to the specific embodiments thereof except as defined in the appended claim.

I claim:

A process for preparing stable, organic solvent free aqueous dispersions of a polymer of ethylene which is a solid at normal temperature and which by X-ray diffraction analysis shows a crystalline structure, which comprises preparing a mixture comprising a dispersing agent and a solution of said polymer in a hot substantially water-immiscible volatile organic solvent, adding hot water to said mixture during continuous agitation at elevated temperature, and then removing the organic solvent from the emulsion by volatilization.

ALBERT STANLEY GOMM.